United States Patent
Geraud et al.

(10) Patent No.: US 10,839,097 B2
(45) Date of Patent: Nov. 17, 2020

(54) SECURING A CONFIRMATION OF A SEQUENCE OF CHARACTERS, CORRESPONDING METHOD, DEVICE AND COMPUTER PROGRAM PRODUCT

(71) Applicant: INGENICO GROUP, Paris (FR)

(72) Inventors: Remi Geraud, Antony (FR); Hiba Koudoussi, Paris (FR); David Naccache, Paris (FR)

(73) Assignee: INGENICO GROUP, Paris (FR)

(*) Notice: Subject to any disclaimer, the term of this patent is extended or adjusted under 35 U.S.C. 154(b) by 85 days.

(21) Appl. No.: 15/201,549

(22) Filed: Jul. 4, 2016

(65) Prior Publication Data

US 2017/0004330 A1 Jan. 5, 2017

(30) Foreign Application Priority Data

Jul. 3, 2015 (FR) .................................. 15 56352

(51) Int. Cl.
*G06Q 10/00* (2012.01)
*G06F 21/62* (2013.01)
(Continued)

(52) U.S. Cl.
CPC .......... *G06F 21/6245* (2013.01); *G06F 21/31* (2013.01); *G06F 21/55* (2013.01); *G06F 21/85* (2013.01); *G06Q 20/206* (2013.01); *G06Q 20/34* (2013.01); *G06F 2221/031* (2013.01); *G06F 2221/034* (2013.01); *G06F 2221/2137* (2013.01); *G06F 2221/2143* (2013.01)

(58) Field of Classification Search
CPC . G06F 21/6245; G06F 17/30699; G06F 21/84

USPC .............................................. 705/18; 380/243
See application file for complete search history.

(56) References Cited

U.S. PATENT DOCUMENTS 5,805,064 A * 9/1998 Yorkey ............... G08B 25/008
340/4.3
6,092,202 A * 7/2000 Veil ........................ G06F 21/34
705/64

(Continued)

FOREIGN PATENT DOCUMENTS

EP 1788507 A2 5/2007
FR 2852717 A1 9/2004

OTHER PUBLICATIONS

English abstract of FR 2852717 retrieved from Espacenet on Jul. 4, 2016.
(Continued)

*Primary Examiner* — Rokib Masud
(74) *Attorney, Agent, or Firm* — David D. Brush; Westman, Champlin & Koehler, P.A.

(57) ABSTRACT

The proposed technique relates to a method for securing a confirmation of a sequence of characters (SEQ) entered by a user on an electronic data entry device comprising an unsecured processor and a secured processor. This method, implemented in the secured processor, comprises determining a processing operation to be applied to said sequence of characters (SEQ), as a function of a signal (SIG_V) representing a confirmation, by the user, of the sequence of characters (SEQ), the signal (SIG_V) representing a confirmation being delivered by a confirmation means belonging to a set comprising at least two distinct confirmation means.

9 Claims, 4 Drawing Sheets

Figure 1:
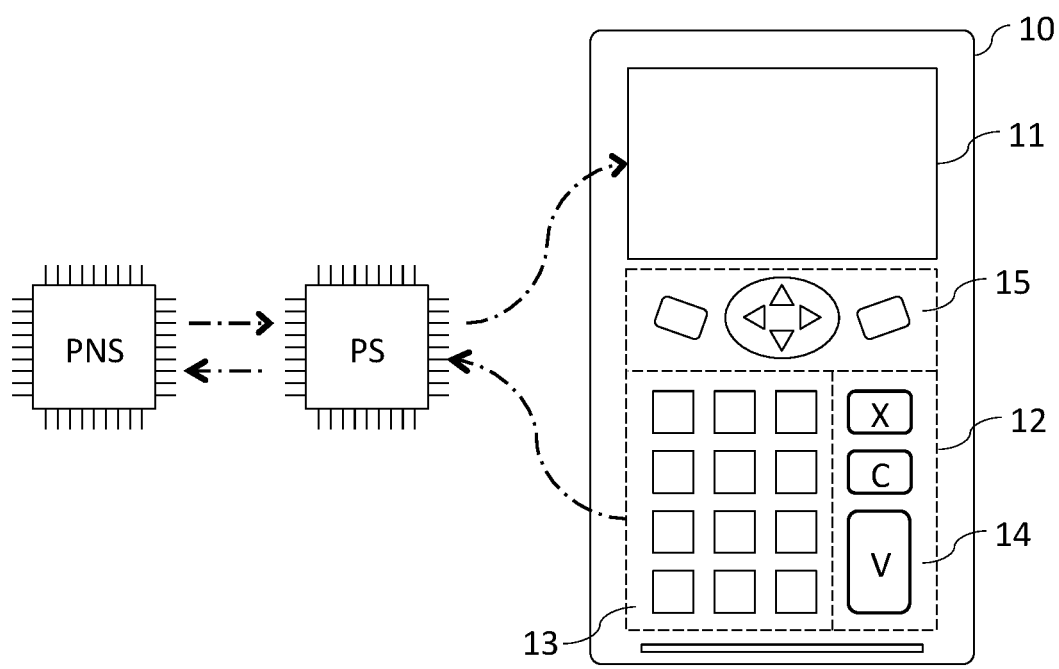

(51) Int. Cl.
*G06F 21/85* (2013.01)
*G06F 21/31* (2013.01)
*G06F 21/55* (2013.01)
*G06Q 20/20* (2012.01)
*G06Q 20/34* (2012.01)

(56) References Cited

U.S. PATENT DOCUMENTS

| | | | | | |
|---|---|---|---|---|---|
| 2005/0138109 | A1* | 6/2005 | Redlich | ............ | G06F 17/30699 709/201 |
| 2005/0138110 | A1* | 6/2005 | Redlich | ............ | C07K 14/70575 709/201 |
| 2006/0129710 | A1* | 6/2006 | O'Connor | ............... | G06F 21/71 710/36 |
| 2009/0067627 | A1* | 3/2009 | Hogl | ............ | G06F 21/84 380/243 |
| 2013/0246268 | A1* | 9/2013 | Moshfeghi | ......... | G06Q 20/3278 705/44 |
| 2014/0327629 | A1* | 11/2014 | Jobs | ................. | H04M 1/72522 345/173 |

OTHER PUBLICATIONS

English abstract of EP 1788507 retrieved from Espacenet on Jul. 4, 2016.
Preliminary search report from FR 1556352, Feb. 12, 2016, MEIS, Marc.
European Search Report with regard to the counterpart EP Patent Application No. 16177228.0 dated Sep. 15, 2017.
English translation of the Written Opinion dated Feb. 12, 2016 for corresponding French Application No. 1556352.

* cited by examiner

SECURING A CONFIRMATION OF A SEQUENCE OF CHARACTERS, CORRESPONDING METHOD, DEVICE AND COMPUTER PROGRAM PRODUCT

CROSS-REFERENCE TO RELATED APPLICATION

This U.S. Non-Provisional patent application claims priority from French Patent Application Serial No. 15 56352, filed on Jul. 3, 2015, the entire content of which is incorporated herein by reference.

FIELD OF THE TECHNOLOGY

The field of the technology is that of electronic devices for the entry of data used to carry out operations that bring into play or relate to confidential objects. Examples that may be cited are payment operations which bring into play a bank-card number or relate to an entry of a confidential code associated with a payment card. Other operations, for example medical or legal operations concerning an individual's own biological data or property ownership data are also concerned by the present technique.

BACKGROUND

Certain electronic data entry devices, such as payment terminals for example, are specifically designed in terms of both hardware and software, to provide the best possible protection of confidential data that could be entered therein. This protection against intrusion or attack can be done at several levels. At the level of the physical constitution of the electrical data entry device, its frame can for example consist of a tamper-resistant inviolable casing, or a casing known as a tamper-evident casing that leaves a visible trace of any attempt at sabotage, or again a tamper-responsive casing which provides an appropriate response to a detection of intrusion. The use of electronic circuits etched in the mass or multi-layer circuits also provides reinforced security for the device by making it very complicated for malicious individuals to intercept confidential data by placing probes on certain connections of the device. As regards the functional constitution of the device, the sensitive data elements are generally encrypted and their processing is subjected to cryptographic protocols. Finally, at the software level, it is usually preferred to use components that can be implemented only within secured processors inaccessible to third parties.

One quid pro quo of this high level of security is that the flexibility of use offered by such devices remains limited. To certify an application so that its execution can be permitted in the secured processor of the device is often a lengthy process and leads to constraints. In a world with a wealth of varied electronic apparatuses such as mobile telephones, personal digital assistants and microcomputers, a need for comparable flexibility has emerged for data entry devices, also called secured devices, intended for use in the performance of operations that bring into play or relate to confidential objects. It is known that the operating systems commonly called open operating systems offer an abundance of useful, user-friendly applications that are worthwhile to implement in order to comply with this need for flexibility in secured devices. Thus, increasing numbers of secured electronic data devices comprise, in addition to the secured processor, an unsecured processor capable of executing third-party applications, for example applications downloadable on a distribution platform made available by the manufacturer of the device. This opening to software applications other than those strictly secured has the drawback of potentially endangering the security of the data entered on the secured device. Thus, a malicious application (or an application polluted by malicious execution sequences) could spy on and betray security processes of the equipment, in order to retrieve confidential information. A malicious application could also imitate the appearance of a legitimate application (for example a payment application) in order to deceive a user and thus retrieve confidential information.

While the general public has started getting sensitized to the existence of these fraudulent techniques relating to personal communications terminals (tablets, smartphones, microcomputers, etc.) people do not generally have the same level of vigilance over more specialized devices (such as payment terminals) which however are an integral part of their daily life but which they assume are secured by the very nature of the operations that are commonly performed in these devices. Thus, the general public tends to put its trust more naturally in such devices even though the risk of having data stolen still exists.

There is therefore a need to propose electronic data entry devices that include means that can be used to prevent or slow down attempts to fraudulently retrieve confidential data.

SUMMARY

The proposed technique offers a solution without at least some of these problems of the prior art through an original method for securing a confirmation of a sequence of characters entered by a user on an electronic data entry device comprising an unsecured processor and a secured processor. According to a first aspect of the proposed technique, this method is implemented within the secured processor and comprises a step for determining a processing operation to be applied to the sequence of characters entered, as a function of a signal representing a confirmation of this sequence of characters by the user. The signal representing a confirmation is delivered by a confirmation means belonging to a set comprising at least two distinct confirmation means available on the electronic data entry device.

Thus, the proposed technique makes it possible, at the level of a secured processor of an electronic data entry device, to differentiate the processing operations to be applied to a sequence of characters entered by a user on this device, according to a means for confirming of said device used by the user to confirm this sequence of characters entered. In this way, it is especially possible to assign, more particularly, a first confirmation means (called a secured confirmation means) of said device when confirming information considered to be sensitive (the confirmation of a confidential code associated with a payment card for example) and a second confirmation means (called an unsecured confirmation means) different from the first means, when confirming information considered to have low sensitivity or no sensitivity (the confirmation of an amount to be paid for example).

In one particular embodiment of the proposed technique, the step for determining a processing operation to be applied to the sequence of characters comprises:
  a step for obtaining the signal representing a confirmation of said sequence of characters;
  a step for obtaining, within a secured memory, said sequence of characters;

when the signal represents an unsecured confirmation:
a step for transmitting said sequence of characters to a current application;
a step for eliminating said sequence of characters from said secured memory.

In this way, a sequence of characters, the entry of which is confirmed with the unsecured confirmation means, is routinely transmitted to the current application being executed on the electronic data entry device without any other form of verification. The current application generally corresponds to the application being executed on the electronic data entry device, the graphic interface of this application being displayed on a screen of said device at the time of confirmation of the sequence of pre-entered characters. It can be executed by the secured processor or by the unsecured processor and it is most often the application that originated the request for information entry made to the user (for example by means of a message displayed on a screen of the device and requesting the user to enter a piece of information of a given nature), that has caused the entry and the confirmation of said sequence of characters.

In one particular embodiment of the proposed technique, the step for determining a processing operation to be applied to the sequence of characters furthermore comprises the following steps when the signal represents a secured confirmation:
a step for comparing the current application with a list of predetermined applications:
when said current application is present in the list of predetermined applications:
a step for transmitting said sequence of characters to said current application;
a step for eliminating said sequence of characters from said secured memory;
when said current application is absent from the list of predetermined applications, a step for eliminating said sequence of characters from said secured memory.

In this way, when the means of secured confirmation is used to confirm the entry of a sequence of characters, the secured processor carries out an additional verification to determine the processing to be applied to this sequence of characters. If it appears that the current application does not belong to a predetermined list of applications—in other words if it does not appear to be legitimate that the current application requires the use of a secured confirmation for the pieces of information entered therein—the sequence of characters entered by the user is purely and simply discarded (i.e. eliminated from the secured memory associated with the secured processor). It is therefore not transmitted to the current application (either because this application is suspect or because the user has inadvertently used the secured confirmation means to confirm the entry, instead of the unsecured confirmation means which should have been used given the nature of the current application), and the potentially confidential data entered is not compromised. Conversely, if it appears legitimate to use the secured confirmation means for the current application (this application is effectively part of the list of predetermined applications), then the sequence of characters entered is transmitted to this current application.

In another particular embodiment of the proposed technique, the securing method furthermore comprises, when the current application is absent from the list of predetermined applications, a step for displaying, on a screen of the electronic data entry device, a piece of data representing the elimination without transmission of said sequence of characters.

In this way the user can be warned, for example by means of a message displayed on the screen of the electronic data entry device, that the sequence of entered characters has been eliminated without being transmitted to the current application, and can be given an explanation for it.

In yet another particular embodiment of the proposed technique, the length of the sequence of characters obtained within the secured memory is predefined.

Thus, the length of the sequence of characters stored within the secured memory associated with the secured processor can be adapted to the characteristics of the confidential data that can be entered on the type of device considered. For example, on a payment terminal, a piece of confidential information commonly entered is the four-digit personal identification number (PIN code) associated with a payment card. By then limiting the length of the sequence of characters stored in the secured memory to the four last characters entered, the technology makes sure to secure any personal identification code entered while at the same time not fully blocking the current application in its current operation so long as a confirmation is not done (the characters which do not form part of the last four characters entered being transmitted to the current application as and when new characters are entered by the user). This limit on the number of characters stored in the secured memory also makes it possible to take precautions against possible attacks on the secured processor: thus, a malicious person could not for example compromise the secured processor by entering a very large number of characters without ever carrying out the confirmation.

In another particular embodiment of the proposed technique, the sequence of characters is eliminated from the secured memory of the electronic data entry device if no new entry of characters is done on the device for a predetermined period of time.

Thus, the retention time for potentially confidential data within the data entry electronic device is limited: without any action by the user at the end of a given time, these pieces of data are for example eliminated from the secured memory associated with the secured processor. This is an additional securing step because the pieces of data entered by the user on the electronic data entry device, even if not confirmed, are kept only temporarily within the device.

In one particular embodiment of the proposed technique, the electronic data entry device is a payment terminal.

According to another aspect, the proposed technique also relates to an electronic data entry device which comprises an unsecured processor and a secured processor, and comprises means for securing a confirmation of a sequence of characters entered by a user. Such an electronic data entry device comprises:
a set comprising at least two distinct confirmation means;
means for the determining, by said secured processor, of a processing operation to be applied to said sequence of characters, as a function of a signal representing a confirmation means, used by said user to confirm said sequence of characters, said signal representing a confirmation being delivered by one of the confirmation means belonging to said set comprising at least two distinct confirmation means.

According to a preferred implementation, the different steps of the method of securing according to the proposed technique are implemented by one or more computer software program or programs comprising software instructions to be executed by a data processor according to the proposed technique and being designed to command the execution of the different steps of the method.

The technology is therefore also aimed at providing a program that can be executed by a computer or by a data processor, and especially a secured processor, this program comprising instructions to command the execution of the steps of a method as mentioned here above.

This program can use any programming language whatsoever and can be in the form of a source code, object code or a code that is intermediate between source code and object code, such as in a partially compiled form or in any other desirable form.

The proposed technique also aims to provide an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the technology can be especially uploaded to an Internet type network.

As an alternative, the information carrier can be an integrated circuit into which the program is incorporated, the circuit being adapted to executing or to being used in the execution of the method in question.

According to one embodiment, the technology is implemented by means of software and/or hardware components. In this respect, the term "module" can correspond in this document equally well to a software component and to a hardware component as to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, gateway, router, etc) and is capable of accessing hardware resources of this physical entity (memories, recording media, communications buses, input/output electronic boards, user interfaces, etc).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

Each component of the system described here above naturally implements its own software modules.

The different embodiments mentioned here above can be combined with one another to implement the proposed technique.

LIST OF FIGURES

Figure 2:
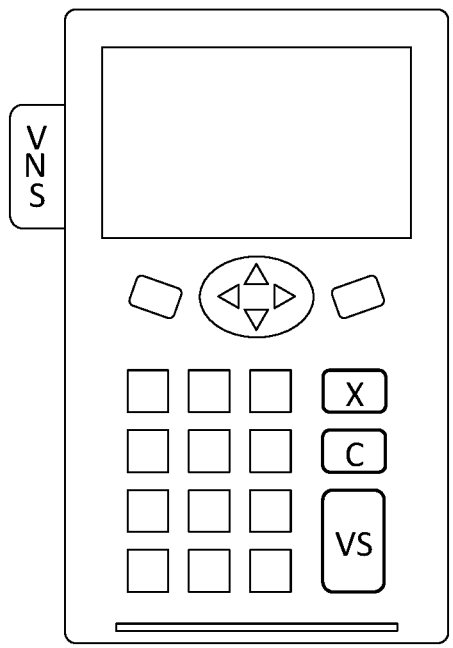
Figure 3:
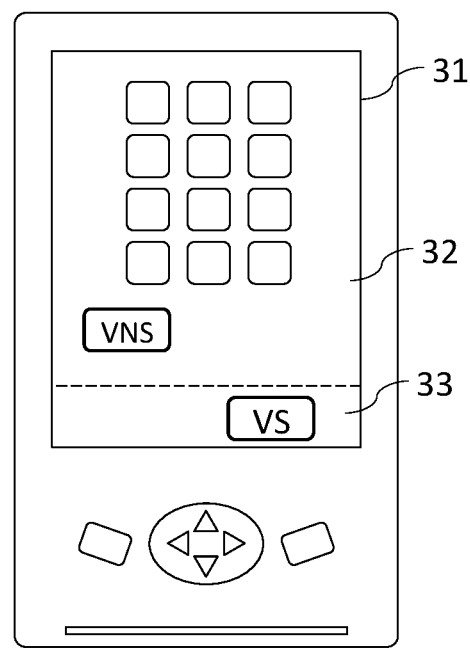
Figure 4:
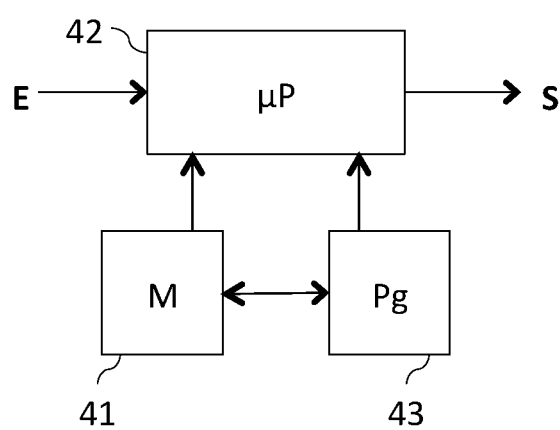
Figure 5:
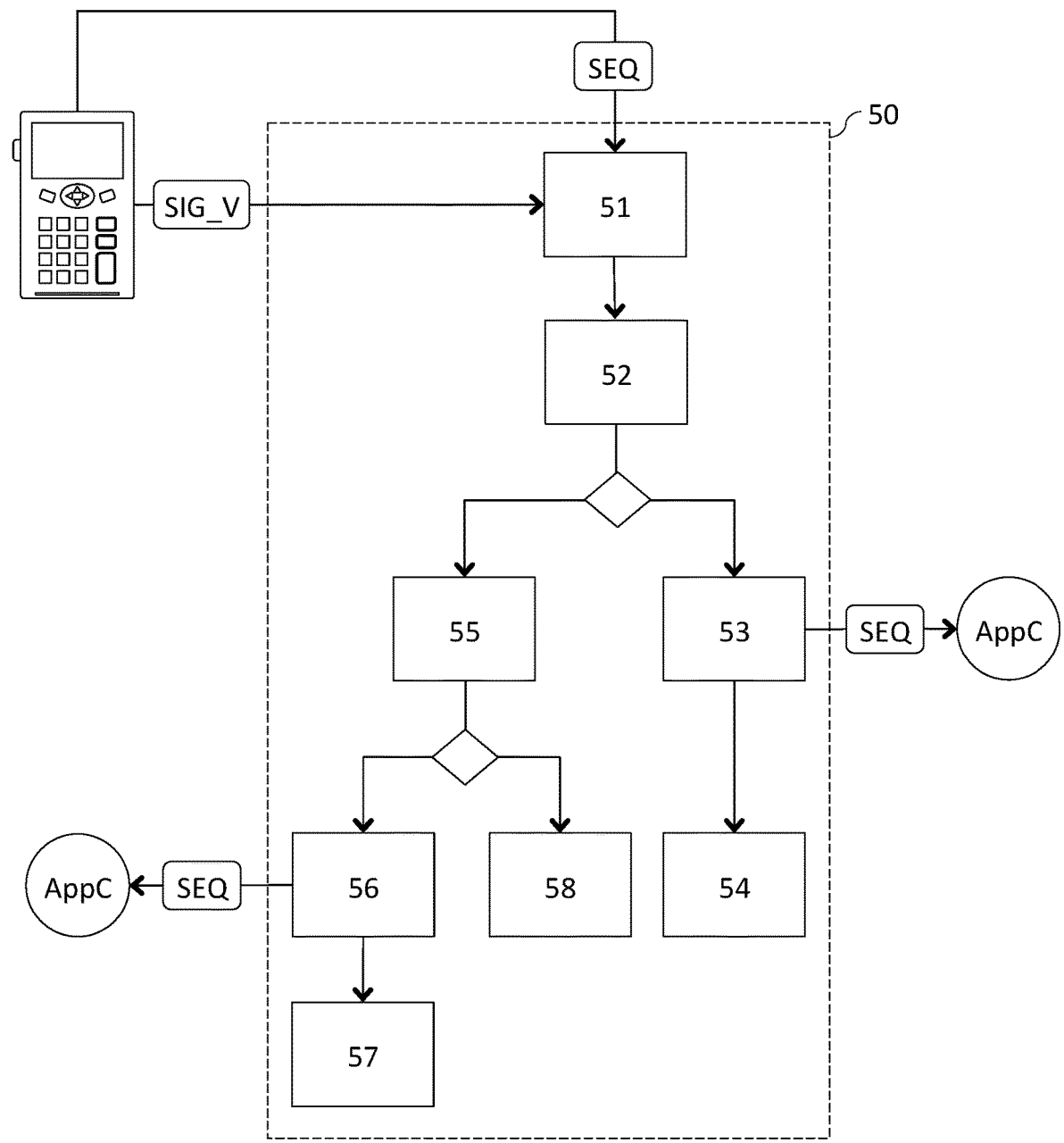
Figure 6:
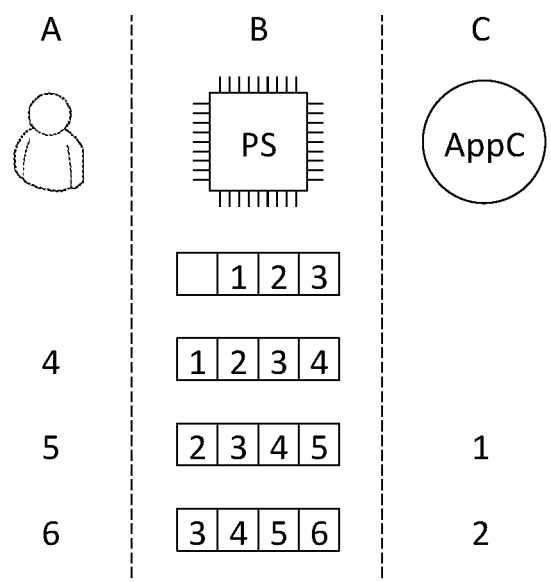

Other features and advantages of the proposed technique shall appear more clearly from the following description of a preferred embodiment, given by way of a simple illustratory and non-exhaustive example and from the appended drawings, of which:

FIG. 1 describes an example of an electronic data entry device such as it exists in the prior art;

FIG. 2 presents an electronic data entry device on which information is entered by means of physical buttons in one particular embodiment of the proposed technique;

FIG. 3 presents an electronic data entry device on which information is entered by means of buttons displayed on a touch-screen in one particular embodiment of the proposed technique;

FIG. 4 describes a simplified architecture of a secured execution environment comprising a secured processor within which the method for securing a confirmation of a sequence of characters can be implemented, according to one particular embodiment of the proposed technique;

FIG. 5 illustrates the steps implemented within a secured processor of an electronic data entry device for the performance of the method for securing a confirmation of a sequence of characters according to one particular embodiment of the proposed technique;

FIG. 6 presents an example of a sequence of characters stored within a secured memory associated with the secured processor, as and when entries are made by a user on the keypad of an electronic data entry device according to one particular embodiment of the proposed technique.

DETAILED DESCRIPTION

The proposed technique can be applied more particularly to electronic data entry devices that comprise two processors, a secured processor and an unsecured processor. The secured processor has access to a secured memory and the association of these two elements forms a secured environment of execution within the device. The term "secured environment of execution" is understood to imply securing of both hardware and software, especially with the implementation of the different techniques of protection presented with reference to the prior art (physical constitution of the casing for protecting secured components, electronic circuits etched in the mass or multilayer circuits, encryption of data, etc.). This securing also relies on the use, within the secured processor, of an operating system that is secured in the sense that it comprises a set of means (control means, access restriction, cryptography, etc.) supposed to make it less vulnerable and to protect it more efficiently against the different types of attacks that it could face. Conversely, the operation system implemented within the unsecured processor of the electronic data entry device is a system that can be called an "open system" in the sense that there is widespread and adequate access to this system, thus favoring the development of numerous applications. The notion of an open operating system encompasses not only a truly open operating system such as original UNIX and LINUX systems but also widely commercialized systems such as for example the different versions of Microsoft Windows™. The utility of such devices—which include both a secured processor and an unsecured processor—lies in their capacity to be capable of implementing not only secured applications inasmuch as they are most often certified by a trust organization and are authorized for execution by the secured processor but also third-party applications, not necessarily certified. These third-party applications executed by the unsecured processor intensify the user's experience and make it possible to open the device to new functions. Referring to FIG. 1, we present an electronic data entry device (10) of this type, such as it exists in the prior art. Such a device (10) most usually comprises a screen (11) used to display the graphic interface of a current application executed within the device and a keypad (12) enabling a user to interact with said application. The keypad (12) traditionally comprises several sets of keys. A first set, called a set of entry keys (13), groups together the keys used by a user to enter information on the device. These keys are generally associated with one or more alphanumeric or punctuation characters. By successive applications of pressure on these entry keys, a user can thus form a sequence of characters representing for example the amount of the financial transaction or a confidential code associated with a payment card. A second set of keys, herein called a set of command keys (14), groups together the keys by which a user can act on a sequence of characters preliminarily entered by means of entry keys (13). These keys include keys for confirmation (V), correction (C), or cancellation (X) of a sequence of preliminarily entered characters. Finally, other keys which are neither entry keys nor command keys and which are grouped together here under the generic term of a set of ancillary keys (15) can complement the keypad (12). They can for example be navigation keys, function keys, shortcuts, etc.

In such an electronic data entry device (10), the secured applications are implemented by a secured processor (PS), while the unsecured third-party applications are implemented by an unsecured processor (PNS). The unsecured processor (PNS) is generally placed under the control of the secured processor (PS) in a master-slave type relationship. In particular, any data coming from or intended for the unsecured processor travels through the secured processor. In this context, the secured processor is especially capable of intercepting any piece of data entered by a user on the keypad (12) of said device even if the entry of this data has been requested by a third-party application executed by the unsecured processor (PNS). Besides, when an electronic data entry device (10) of this type is used to carry out a secured transaction involving the entry of confidential data (for example a payment operation), the interaction means of the device for interacting with the user (for example the screen (11), the keypad (12), a card reader, etc.) come entirely under the control of the secured processor (PS). The unsecured processor (PNS) is then no longer authorized to interact with these elements, thus ensuring reinforced securing of these sensitive operations because only certified applications executed within the secured processor are then capable of accessing the exchanged data.

The device presented with reference to FIG. 1, which comprises a physical keypad, is given purely by way of a non-exhaustive illustration. In particular, the above considerations relating to the different sets of keys present on a keypad remain of course valid in the case of a virtual keypad displayed on a touch screen of said device. It often happens that the electronic data entry keypad includes only one main processor capable of successively fulfilling the role of a secured processor on the one hand and an unsecured processor on the other hand. In this case, the secured execution environment takes the form of a specific execution mode of this main processor of the electronic data entry device.

Throughout the rest of the document, for reasons of simplification, it is assumed that the electronic data entry device is an electronic payment terminal. This example is given purely by way of a non-exhaustive illustration and the proposed technique can be implemented within other types of electronic data entry devices such as smartphones or tablets without departing from the scope of the present technology.

In most existing electronic data entry devices, one and only one confirm key (or "enter" key) is generally dedicated to confirming any operation requiring the confirmation of an entry preliminarily performed by a user. The keypad of a payment terminal, such as the one presented in FIG. 1, thus classically comprises a single confirm key (most usually associated with the color green) intended to confirm any entry by a user (in the present example this is a key (V) included in the set of command keys (14)). Whatever the nature of the operation in progress on the electronic data entry device, this same confirm key (or "enter" key) is used to confirm any sequence of characters entered by the user. Thus, the confirm key (V) can for example be used initially by a merchant to confirm the amount to be paid by the customer following an act of purchase, this amount having been preliminarily entered by means of entry keys (13). The merchant then presents the payment terminal (10) to the customer who verifies the amount displayed on the screen (11), enters the confidential code associated with the payment card preliminarily introduced into the device and uses in turn this same confirm key (V) to confirm the correct entry of his confidential code and thus activate the payment operation.

With these existing electronic data entry devices, which offer only one means to confirm a sequence of characters entered by a user, the same confirm key is therefore used equally well to confirm an ordinary operation (the term "ordinary" is understood to mean a non-vital operation which does not bring into play sensitive data, for example the entry of an amount) and a critical operation (which relates to sensitive data, the entry of a confidential code for example). In addition, it can be noted that with the existing devices, this same confirm key is also used equally well to confirm an operation requested by a third-party unsecured application (executed by an unsecured processor) and to confirm an operation requested by a secured application (executed by the secured processor).

The drawback of this approach is that it allows malicious individuals to take the users of such electronic data entry devices off guard. Since the confirmation mechanisms currently used are similar, both in the nature of the operations (ordinary vs. vital) and in their source (requested by an unsecured application vs. a secured application), phishing techniques which consist in stealing confidential data from a user by means of a malicious application imitating a legitimate application can prove to be particularly efficient.

The technique described here proposes to remedy at least a part of the problem, firstly through an electronic data entry device comprising at least two distinct means for confirming a sequence of characters entered, and secondly by the implementation of a method for securing the confirmation of said sequence of characters entered, the method taking account of the means used to confirm said entry.

Referring to FIG. 2, we present an example of an electronic data entry device in one particular embodiment of the technology. As already described in the presentation of the general context of the technology, this device comprises two processors (not shown): a secured processor to implement secured applications and an unsecured processor to implement unsecured third-party applications (alternatively, and in another particular embodiment of the technology, the electronic data entry device can embed only one main processor capable of successively fulfilling the roles of secured processor and unsecured processor without bringing the general principle of the technology into question). Unlike a classic electronic data entry device as already presented with reference to FIG. 1, the device described herein comprises at least two distinct confirmation means that can be used to confirm a sequence of preliminarily entered characters: a confirmation means called a secured confirmation means (VS) and a confirmation means called an unsecured confirmation means (VNS). In the example of FIG. 2, these confirmation means are physical buttons. To avoid disturbing users habituated to using a classic electronic data entry device, the secured confirm button (VS) is ideally placed at the same position as the one traditionally occupied by the single confirm button of an equivalent prior-art device (it occupies the same position, on the front face, at the bottom right hand in the example of FIGS. 1 and 2: the secured confirmation means (VS) of FIG. 2 are positioned in place of the classic confirmation means (V) of FIG. 1). These secured confirmation means (VS) are placed under the exclusive control of the secured processor, for example by means of a dedicated physical wiring system. In one particular embodiment of the proposed device, the unsecured confirm button (VNS) is isolated from the rest of the keypad so that it is relatively distant from the secured confirm button (VS). The unsecured confirm button (VNS) is positioned for example on one face of the device which is different from the one that receives the rest of the keypad. If the rest of the keypad is integrated, as is generally the case, on the front face of the electronic data entry device, then the unsecured confirm button (VNS) is for example positioned on the edge of the device that is as distant as possible from the secured confirm button or again on its rear face. In this way, access to this unsecured confirm button is made more difficult and its position and its use become unusual for a user (for example a customer).

If the essential part of the keypad of the electronic data entry device consists not of a physical keypad but of a virtual keypad displayed on a touch screen, the same general principle offering two distinct confirmation means (a secured confirmation under the control of the secured processor and an unsecured confirmation) is also applied. Referring to FIG. 3, we present another particular embodiment of such a device which comprises a touch screen (31) which can display a virtual keypad amongst other graphic elements. This touch screen (31) is divided into at least two areas: one area known as an unsecured area (32) and one area known as a secured area (33). The unsecured area (32) defines one part of the touch screen within which any application (whether executed by the secured processor or by the unsecured processor) is capable of displaying data and receiving signals of pressure on one position of said area. The secured area (33) for its part is placed under the exclusive control of the secured processor: only a secured application executed by the secured processor is capable of displaying or receiving information thereon. It is in this zone that the secured confirmation means (VS), which are also under the exclusive control of the secured processor, are displayed. Other touch control buttons (not shown) such as a correction button or a cancellation button for correcting or cancelling the entry, can also be displayed in this secured zone, on which the unsecured processor has no control: it has no access to this area whether to display elements or to intercept events (pressures applied by a user) which would occur therein. The unsecured confirmation means (VNS) are for their part displayed in the unsecured zone (32) of the touch screen, possibly under the control of an unsecured application.

The two particular embodiments of the electronic data entry device presented in FIGS. 2 and 3 are given purely by way of a non-exhaustive illustration. Other combinations are possible, so long as the secured confirmation means (VS) remain placed under exclusive control of the secured processor.

In addition to the set comprising at least the two distinct confirmation means namely the secured confirmation means (VS) and the unsecured confirmation means (VNS), the electronic data entry device also comprises means for determining a processing operation to be applied to the sequence of characters entered, according to a signal representing the confirmation means used by the user to confirm said sequence of characters. This representative signal representing a confirmation is delivered by one of the confirmation means belonging to the set comprising at least two confirmation means. In other words, it is delivered following a pressure, by the user, on one of the buttons (touch buttons or physical buttons) constituting the secured confirmation means (VS) and unsecured confirmation means (VNS).

These means for determining a processing operation to be applied are implemented by a secured processor in a secured execution environment such as the one presented with reference to FIG. 4.

For example, the secured execution environment comprises a secured memory (41) constituted by a buffer memory, a processing unit (42), equipped for example with the secured processor and driven by the secured computer program (43) implementing the steps needed to secure a confirmation of a sequence of characters according to the proposed technique.

At initialization, the code instructions of the computer program (43) are for example loaded into a memory and then executed by the secured processor of the processing unit (42). The processing unit (42) inputs (E) for example a signal representing a confirmation following the use by the user of the electronic data entry device of one of the confirmation means belonging to the set comprising at least two distinct confirmation means. The secured processor of the processing unit (42) then implements the steps of a method for securing the confirmation of the sequence of characters preliminarily entered by the user according to the instructions of the computer program (43) and determines at output (S) the processing operation to be applied to said sequence of characters as a function of the signal representing a confirmation.

To this end, the secured execution environment comprises, in addition to the secured memory (41), means of data transmission/reception making it possible firstly to exchange data coming from an entry device (for example a keypad) and intended for a rendering device (for example a screen) of the electronic data entry device, and secondly to exchange data with an unsecured processor of the electronic data entry device. Thus, the secured execution environment is especially capable of intercepting data coming from or intended for an application executed on the unsecured processor of the electronic data entry device. These means of transmission/reception of data can take the form of a software connection interfaces or hardware interfaces. According to the proposed technique, such a secured execution environment furthermore comprises storage means which can take the form of a database or a set of configuration files, or an access to such storage means. These storage means can especially host a list of predetermined applications which lists the applications within which the use of a secured confirmation means is considered to be legitimate. These applications include for example the secured or certified applications generally executed by the secured processor which bring into play or require the entry of confidential data, for example a payment application. This list however is not limited to this type of application. It can also include applications that are executed by the unsecured processor but are for example well known and widespread (such as cash desk applications) or applications for which imposing the use of the unsecured confirmation means, through its unusual position, appears to be counterproductive or totally disturbing for a user. This list of applications is updated for example by the manufacturer of the electronic data entry device.

Referring now to FIG. 5, we present the steps implemented in the secured processor of an electronic data entry device to carry out the method of securing a confirmation of a sequence of characters, according to one particular embodiment of the proposed technique. The electronic data entry device considered comprises at least two means for confirming an entered sequence of characters, as explained here above: a means of secured confirmation (VS) placed under the exclusive control of the secured processor, and a means of unsecured confirmation. In the particular embodiment presented with reference to FIG. 5, a current application (AppC), secured or not secured, is being executed and relays information to a user by means for example of a graphic interface displayed on the screen of the electronic data entry device. The current application (AppC) can especially request the user to enter information in order to continue a transaction.

During an interception step 51, the secured processor intercepts the entries made by a user on the keypad (physical or tactile) of the electronic data entry device until a signal (SIG_V) representing a confirmation of said entry is obtained. Thus, each time that the user presses an entry key of said keypad and so long as a signal representing a confirmation is not obtained, the associated character is intercepted and stored in a secured memory associated with the secured processor. The set of characters entered then forms a sequence of characters (SEQ) recorded in the secured memory associated with the secured processor. In the embodiment proposed with reference to FIG. 5, the interception of the entered characters and the storage in said memory of the resultant sequence of characters (SEQ) lasts for as long as the confirmation signal (SIG_V) is not obtained. This confirmation signal (SIG_V) is obtained when the user has completed the entry of a desired sequence of characters and when he confirms it by means of one of the two confirmation means (unsecured or secured) made available within the electronic data entry device. According to the means used by the user to confirm his sequence of characters, the signal obtained represents either an unsecured confirmation or of a secured confirmation (this piece of information is for example obtained by determining the physical confirm key that has been pressed or, in the case of a keypad, by detecting the coordinates of the zone of pressure and by deducing the nature of the associated confirmation touch button).

Once the signal (SIG_V) has been received, the secured processor retrieves, in the associated secured memory, the sequence of characters (SEQ) during a step 52 for obtaining said sequence of characters.

When the signal obtained during a step of interception 51 represents an unsecured confirmation, the sequence of characters (SEQ) obtained during the step 52 for obtaining is transmitted (transmission step 53), to the current application (AppC) originating this request for information entry. It may especially be a third-party application executed on the unsecured processor. In this case, there is so to speak no control whatsoever, by the secured processor, of the legitimacy that the current application has or does not have in requesting information from a user. The user is considered to know what he is doing since he is using especially a particular means of confirmation—the unsecured confirm button—preferably situated in a position that is less easily accessible than the rest of the keypad (when a malicious application pretends to be a legitimate application and insists that an unsuspecting user should confirm confidential data by means of this unsecured confirm button, the particular and unusual position of this button ideally has the effect of arousing suspicions on the part of this user).

When this transmission is done, the sequence of characters (SEQ) can then be eliminated (elimination step 54) from the secured memory associated with the secured processor.

When the signal obtained during the interception step 51 represents a secured confirmation, the secured processor implements a step (55) for comparing the current application (AppC) with a list of predetermined applications in order to determine the processing to be applied to the sequence of characters (SEQ) obtained (during the obtaining step 52). The current application considered is the active one when the secured confirm button is pressed (i.e. for example the application with which the graphic interface displayed on the screen of the electronic data entry device is associated at the time of confirmation). The comparison of the current application with the predetermined list of applications can be done on the basis of different criteria, for example a name or an identifier of the application. It can also be implemented on the basis of specific and secured IT markers (or flags) which only the secured processor is capable of implementing, to "flag" certain particular applications, especially applications bringing sensitive data into play. The absence of such markers also in itself defines a current nature of an application: in this example, we thus normally have to deal with an application related to non-critical data for which the use of a secured confirmation normally does not have any meaning. The list of predetermined applications for its part lists the applications within which the use of a secured confirmation means is considered to be legitimate (these applications are generally, but not necessarily always, applications for which it appears to be legitimate that the processing of related data remains within the exclusive domain of the secured processor). These are normally applications bringing into play confidential data such as payment transactions involving the entry of bank data, a confidential code associated with a payment card or credit card, sensitive information on medical or legal matters relating to an individual's own biological or property ownership data, etc.

Should the current application (AppC) be in the predetermined list of applications, the sequence of characters (SEQ) obtained is transmitted, during a transmission step 56, to the current application (AppC) originating this request for entry of information. This example corresponds to the nominal case where it appears legitimate for the user to use the secured confirm button to confirm a preliminarily made entry with respect to the current application being executed. The sequence of characters (SEQ) entered then forms in any case a piece of confidential or sensitive data which must be managed exclusively by the secured processor of the electronic data entry device. Once this transmission of the sequence of characters (SEQ) to the current application (AppC) has been done, the sequence of characters (SEQ) can be eliminated from the secured memory associated with the secured processor (elimination step 57).

If not, when the current application (AppC) is absent from the predetermined list of applications, the sequence of characters (SEQ) is eliminated from the secured memory associated with the secured processor (elimination step 58).

It is then not transmitted to the current application (AppC). Indeed, the secured processor has then detected a secured confirmation in association with a current application which in any case should not request such a type of confirmation. This example can correspond to an operating mistake on the part of the user (having used the secured confirm button instead of the unsecured confirm button) or again an attempt at fraud: it is then necessary not to transmit the sequence of characters (SEQ) entered to the current application (AppC), and this sequence is purely and simply eliminated. In one particular embodiment of the proposed technique, a piece of data representing the elimination without transmission of said sequence of characters (for example a warning message) can then be displayed on the screen of the electronic data entry device in order to warn the user that his entry has not been processed and explaining the reasons for this to him.

In one particular embodiment of the proposed technique, the predetermined list of applications contains only applications capable of being executed by the secured processor of the electronic data entry device. In this way, provided the signal obtained represents a secured confirmation, the sequence of characters (SEQ) is never transmitted to the unsecured processor and remains under the exclusive responsibility of the secured processor.

The method described here above is implemented at the secured processor of the electronic data entry device, for example by means of an application or a dedicated secured process (different from the current application (AppC)) executed within this secured processor, said application of dedicated secured process being constantly "listening" in the background. Provided that the confirmation of a first sequence of preliminarily entered characters is detected, the method can be taken to its conclusion and result, as the case may be, in the transmission or elimination of said first sequence of characters. It is then immediately implemented again in order to secure the confirmation of the following sequence of entered characters.

In one particular embodiment of the proposed technique, the secured processor sends the current application (AppC) a signal representing a pressure on an entry key, whenever the user enters a character by means of an entry key of the electronic data entry device. This signal contains no information of a kind to enable the identification of the character entered. Thus, this signal is used to notify the current application (AppC) that a character is entered without however enabling it to identify this character. In this way, the current application (AppC) is capable of displaying a visual feedback to the user as and when he types, before a confirmation is performed. The current application can for example display an asterisk on a screen of the electronic data entry device whenever a user enters a character. This user is thus informed in real time that his entry has been taken into account. This mechanism also enables the current application (AppC) to count the number of characters already entered by the user in order to verify that an expected number of characters has truly been reached for example.

In another particular embodiment of the proposed technique, the current sequence of characters recorded in the secured memory associated with the secured processor, as and when the user types the sequence, is eliminated from said memory if no entry of characters or no confirmation is done by the user on the electronic data entry device during a predetermined time. In other words, if the secured processor detects neither a new entry of characters nor a confirmation for a predetermined time (for example about ten seconds or one minute) he eliminates the sequence of characters currently pending in the secured memory.

According to yet another particular embodiment of the proposed technique, the number of characters of the sequence of characters that the secured processor is capable of preserving in a secured memory is limited and predetermined. Thus imposing a maximum predefined length on the sequence of characters kept in the secured memory has several advantages. First of all, it enables the current application (AppC) to obtain, under certain conditions, a feedback following entries of characters made by a user without having to necessarily wait for an action of confirmation of the sequence of characters entered, and this is done without in any way sacrificing the securing of possible confidential data entered. If we consider for example a payment terminal for which the primary function is to enable the performance of payment operations by means of classic payment cards, which are associated with four-digit confidential codes, the maximum length of the sequence of characters memorized in the context of the proposed method can be fixed at four characters (because protecting the last four characters entered before confirmation is then in principle sufficient to protect a confidential four-digit code. It goes without saying that this maximum length of four characters is given here purely by way of an illustration and that this length can be fixed at other values in other situations). Referring to FIG. 6, we present an example of a development of such a sequence limited to four characters and preserved in the secured memory associated with the secured processor of an electronic data entry device (column B) following different entries of characters made by a user on this device (column A). The characters transmitted to the current application (AppC) (which is for example executed at the unsecured processor) are indicated in the column C. In this example, the user is considered to have already entered the sequence of characters "123" and to have then successively pressed the keys associated with the characters "4", "5" and "6" in this order. Once the predetermined maximum size of the sequence of characters recorded according to the proposed method has been reached, any new entry of characters leads firstly to an updating of the sequence of characters memorized up to the last four characters entered, and secondly to the immediate transmission of the "released" character to the current application (AppC) (according to the well-known principle in information technology of "first in first out" or FIFO). Thus, if we look at the last line of FIG. 6, a pressure by the user on the key "6" activates an updating of the chosen sequence of characters in the secured memory associated with the secured processor (the value "2345" passes to the value "3456") and the end of retention of the character "2" which is then directly transmitted to the current application (AppC). In this way, so long as a confirmation of an entered sequence of characters has not been detected by the secured processor, only the last four characters entered are kept in the secured memory associated with the secured processor. Rather than depriving a current third-party application (AppC) of any feedback following entries made at the keypad so long as one of the confirm buttons has not been pressed (retention, by the secured processor, of all the entered sequence of characters so long as it is not confirmed), this embodiment therefore enables it to transmit, as and when the keys are struck, the characters which are not part of the last four characters entered (the secured processor retains a finite number of characters entered uniquely). Imposing a maximum predefined length on the sequence of characters preserved in the secured memory also makes it possible to prevent potential attacks aimed for example at compromising the secured processor by saturating the secured memory associated with it by the entry of a string of characters of a very great length without ever carrying out any confirmation.

It must be noted that in other particular embodiments of the proposed technique, control buttons other than the secured confirm buttons and unsecured confirm buttons are capable of impacting the sequence of characters recorded in the secured memory associated with the secured processor. Thus, the effects of the buttons used to correct or cancel an entry made on an electronic data entry device (the respectively buttons (C) and (X) of FIG. 2 for example) are also applied to the sequence of characters registered in the secured memory associated with the secured processor. The correction button thus makes it possible to erase the last character from this sequence of characters. The cancellation button for its part purely and simply eliminates said sequence of characters from the secured memory associated with the secured processor.

The invention claimed is:

1. A computer-implemented method for securing a confirmation of a sequence of characters entered by a user on an electronic data entry device comprising an unsecured processor and a secured processor, the unsecured processor being placed under the control of the secured processor, said method comprising:
   determining, by said secured processor, of a processing operation to be applied to said sequence of characters, as a function of data representing a confirmation, by said user, of said sequence of characters, said data representing the confirmation being delivered by a confirmation button belonging to a set comprising at least two distinct confirmation buttons.

2. The computer-implemented method of claim 1, wherein determining further comprises:
   obtaining the data representing the confirmation of said sequence of characters;
   obtaining said sequence of characters within a secured memory; and
   when said data represents an unsecured confirmation:
      transmitting said sequence of characters to a current application; and
      eliminating said sequence of characters from said secured memory.

3. The computer-implemented method of claim 2, wherein determining further comprises:
   when the data represents a secured confirmation, comparing the current application with a list of predetermined applications;
   when said current application is present in the list of predetermined applications:
      transmitting said sequence of characters to said current application; and
      eliminating said sequence of characters from said secured memory; and
   when said current application is absent from the list of predetermined applications, eliminating said sequence of characters from said secured memory.

4. The computer-implemented method of claim 3, wherein the method further comprises, when said current application is absent from the list of predetermined applications, displaying, on a screen of said electronic data entry device, an indication of the elimination without transmission of said sequence of characters.

5. The computer-implemented method of claim 2, wherein the length of said sequence of characters obtained within said secured memory is predefined.

6. The computer-implemented method of claim 2, wherein said sequence of characters is eliminated from said secured memory if no new entry of characters is done on said electronic data entry device for a predetermined period of time.

7. The computer-implemented method of claim 1, wherein said electronic data entry device is a payment terminal.

8. An electronic data entry device comprising an unsecured processor and a secured processor, the unsecured processor being placed under the control of the secured processor, and comprising means for securing a confirmation of a sequence of characters entered by a user, said electronic data entry device comprising:
   a set comprising at least two distinct confirmation buttons; and
   means for determining, by said secured processor, of a processing operation to be applied to said sequence of characters, as a function of data representing a confirmation button, used by said user to confirm said sequence of characters, said data representing a confirmation being delivered by one of the confirmation buttons belonging to said set comprising the at least two distinct confirmation buttons.

9. A non-transitory computer-readable medium comprising computer-executable instructions that cause a microprocessor to execute a method for securing a confirmation of a sequence of characters entered by a user on an electronic data entry device comprising an unsecured processor and a secured processor, the unsecured processor being placed under the control of the secured processor, said method comprising:
   determining, by said secured processor, of a processing operation to be applied to said sequence of characters, as a function of data representing a confirmation, by said user, of said sequence of characters, said data representing the confirmation being delivered by a confirmation button belonging to a set comprising at least two distinct confirmation buttons.

* * * * *